United States Patent [19]
Sonoda

[11] Patent Number: 5,604,670
[45] Date of Patent: Feb. 18, 1997

[54] POWER CONVERTING APPARATUS AND CONTROL DEVICE FOR A POWER CONVERTING APPARATUS

[75] Inventor: Michiyoshi Sonoda, Tokyo, Japan

[73] Assignee: Kabushiki Kaisha Toshiba, Kanagawa-ken, Japan

[21] Appl. No.: 441,198

[22] Filed: May 15, 1995

[30] Foreign Application Priority Data

Aug. 15, 1994 [JP] Japan .................................. 6-191539
Dec. 22, 1994 [JP] Japan .................................. 6-320846

[51] Int. Cl.$^6$ .................................................. H02H 7/122
[52] U.S. Cl. ............................................ 363/56; 363/50
[58] Field of Search ............................ 363/50, 55, 56

[56] References Cited

U.S. PATENT DOCUMENTS 5,123,746  6/1992  Okado ................................... 363/56
5,216,587  6/1993  Miyazaki et al. ..................... 363/56
5,278,747  1/1994  Falt et al. ............................. 363/56

FOREIGN PATENT DOCUMENTS 3-26281   3/1991  Japan .
4-322173  11/1992 Japan .
5-3680    1/1993  Japan .

*Primary Examiner*—Stuart N. Hecker
*Attorney, Agent, or Firm*—Finnegan, Henderson, Farabow, Garrett & Dunner, L.L.P.

[57] ABSTRACT

A power converting apparatus comprises a converter, a control device, and a protection device. The converter has first and second semiconductor devices coupled in series. The control device outputs a plurality of control signals for switching on the first and second semiconductor devices. The protection device detects the control signals and cuts off the control signals for the first and second semiconductor devices when the control signals for the first and second semiconductor devices are detected simultaneously.

20 Claims, 6 Drawing Sheets

POWER CONVERTING APPARATUS AND CONTROL DEVICE FOR A POWER CONVERTING APPARATUS

BACKGROUND OF THE INVENTION

1. Field of the Invention

The present invention relates to a power converting apparatus which is used for an elevator control device and an electric vehicle control device, and more particularly, the present invention pertains to a power converting apparatus comprising self turn-off type semiconductor devices.

2. Description of the Related Art

FIG. 7 is a circuit diagram of a voltage type inverter such as, for example, an inverter for use with an elevator control device.

The input terminal of a rectifier 2 is connected to a three phase alternating current (AC) power source 1, while the output terminal is connected to an inverter 4 through a condenser 3. Inverter 4 comprises a plurality of self turn-off type semiconductor devices 4u, 4x, 4v, 4y, 4w, 4z, such as bipolar transistors (Tr), giant transistors (GTR), insulated gate bipolar transistors (IGBT), and gate turn off thyristors (GTO). Semiconductor device 4u is connected in series with semiconductor device 4x. Semiconductor device 4v is connected in series with semiconductor device 4y. Semiconductor device 4w is connected in series with semiconductor device 4z. A U-phase terminal of an induction motor 5 is connected between semiconductor device 4u and semiconductor device 4x, a V-phase terminal is connected between semiconductor device 4v and semiconductor device 4y, and a W-phase terminal is connected between semiconductor device 4w and semiconductor device 4z. A current detector 6 detects the current which flows through condenser 3.

Three phase AC power source 1 provides three phase AC voltage for rectifier 2. Rectifier 2 converts the three phase AC voltage to direct current (DC) voltage. Condenser 3 smoothes the DC voltage. Semiconductor devices 4u, 4x, 4v, 4y, 4w, 4z are controlled "on" or "off" by an on/off signal provided from control device 100. For example, semiconductor devices 4u, 4x, 4v, 4y, 4w, 4z are switched according to the following order 4u, 4w, 4y→4u, 4z, 4y→4u, 4z, 4v→4x, 4z, 4v→4x, 4w, 4v→4x, 4w, 4y.

Semiconductor devices 4u, 4x are controlled so as not to be switched on simultaneously. Semiconductor devices 4v, 4y are controlled so as not to be switched on simultaneously. Semiconductor devices 4w, 4z are controlled so as not to be switched on simultaneously.

FIG. 8 is a circuit diagram of control device 100. For example, control of semiconductor device 4u which is controlled "on" or "off" will be explained.

Control device 100 has a first side control device 7, an isolation device 12, and a second side control device 13.

First side control device 7 has a source of electricity P15, a control signal outputting circuit 8, a transistor driver 9, and limiting resistors 10, 11. Control signal outputting circuit 8 outputs a control signal to switch on semiconductor devices 4u, 4x, 4v, 4y, 4w, 4z. The control signal is provided from an external control circuits (not shown) such as a speed control circuit to control the rotation speed of induction motor 5, a current control circuit to control the current supplied to induction motor 5, and a pulse width modulation control circuit. Transistor driver 9 switches on when control signal outputting circuit 8 outputs the control signal.

Isolation device 12 isolates first side control device 7 from second side control device 13. For example, isolation device 12 is a photo-coupler comprising a light-emitting device 12a and a photo detector 12b.

Second side control device 13 has a current amplifying circuit 14, a limiting resistor 15, and condensers 16a, 16b.

Current amplifying circuit 14 has transistors 14a, 14b. Transistor 14a is connected in series to transistor 14b. Limiting resistor 15 is connected between the connection of transistors 14a, 14b and a gate terminal of semiconductor device 4u. Condenser 16a is charged positively. Condenser 16b is charged negatively. Condensers 16a, 16b supply positive voltage or negative voltage to semiconductor device 4u.

When control signal outputting circuit 8 outputs the control signal provided from the external control circuits (not shown), transistor driver 9 switches on. Then current flows in the following circuit path of source of electricity P15—an electric wire 101—light-emitting device 12a—limiting resistor 11—electric wire 101—limiting resistor 10—transistor driver 9. When light-emitting device 12a radiates, photo detector 12b switches on. Then the charge of condenser 16a is discharged through the circuit path of transistor 14a—limiting resistor 15—semiconductor device 4u. As a result, semiconductor device 4u switches on.

However, when the external control circuits does not operate normally and control signal outputting circuit 8 outputs the wrong control signal, transistor driver 9 switches on and the combination of semiconductor devices 4u–4x or 4v–4y or 4w–4z are switched on simultaneously. When source of electricity P15 is picking up noises and light-emitting device 12a radiates in error photo detector 12b switches on, with the result that the combination of semiconductor devices 4u–4x or 4v–4y or 4w–4z are switched on simultaneously. When the combination of semiconductor devices 4u–4x or 4v–4y or 4w–4z are switched on simultaneously, condenser 3 is short-circuited. Therefore the charge of condenser 3 is discharged through the combination of the semiconductor devices 4u–4x or 4v– 4y or 4w–4z which are switched on simultaneously momentarily. IN such a case, the semiconductor devices 4u, 4x, 4v, 4y, 4w, 4z may be damaged.

There are the following methods to prevent the semiconductor devices 4u, 4x, 4v, 4y, 4w, 4z from being damaged. Current detector 6 detects the current flowing through condenser 3. A protection device (not shown) receives the current value which is detected by current detector 6. The protection device cuts off the control signal to the combination of the semiconductor devices 4u–4x or 4v–4y or 4w–4z when the current value is more than a predetermined current value. Japanese Patent Disclosure (kokai) No.3-270690 disclose a method to detect the combination of semiconductor devices 4u–4x or 4v–4y or 4w–4z being switched on simultaneously, when the voltage across these semiconductor devices decrease excessively.

However, after the combination of semiconductor devices 4u–4x or 4v–4y or 4w–4z are switched on simultaneously, the control signal provided for these semiconductor device will be cut off. Therefore the current continues to flow through the semiconductor devices until the control signal is cut off. Therefore it is difficult to protect the semiconductor device.

Also when current or voltage is detected with too great a sensitivity, the wrong detection may occur.

A high-speed switching semiconductor device such as an IGBT requires detection of simultaneous device operation at high-speed. However the methods available for reliably protecting such semiconductor devices are not.

SUMMARY OF THE INVENTION

It is therefore an object of the present invention to provide a power converting apparatus which does not protect the semiconductor device after the semiconductor device being switched on in error, and can detect the semiconductor devices being shorted-circuit before the semiconductor devices operate, and can protect the semiconductor devices.

To achieve the objects, a power converting apparatus according to the present invention comprises a conversion means, a control means, and a protection means. The conversion means has first and second semiconductor devices coupled in series. The control means outputs a plurality of control signals for switching on the first and second semiconductor devices. The protection means detects the control signals and cuts off the control signals for the first and second semiconductor devices when the control signals for the first and second semiconductor devices are detected simultaneously.

The above-described power converting apparatus of the present invention provides the following effects.

If semiconductor devices are shorted-circuit, the control signals outputted from control means can be cut off, because the protection means always observes the control signals. Therefore semiconductor devices are switched off before the semiconductor devices operate. As a result, the power converting apparatus of the present invention can prevent semiconductor devices connected in series from being shorted-circuit, and thereby prevent such semiconductor devices from being damaged.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principals of the invention.

DETAILED DESCRIPTION OF THE PREFERRED EMBODIMENTS

The embodiments of the invention will be explained with reference to the accompanying drawings.

Figure 1:
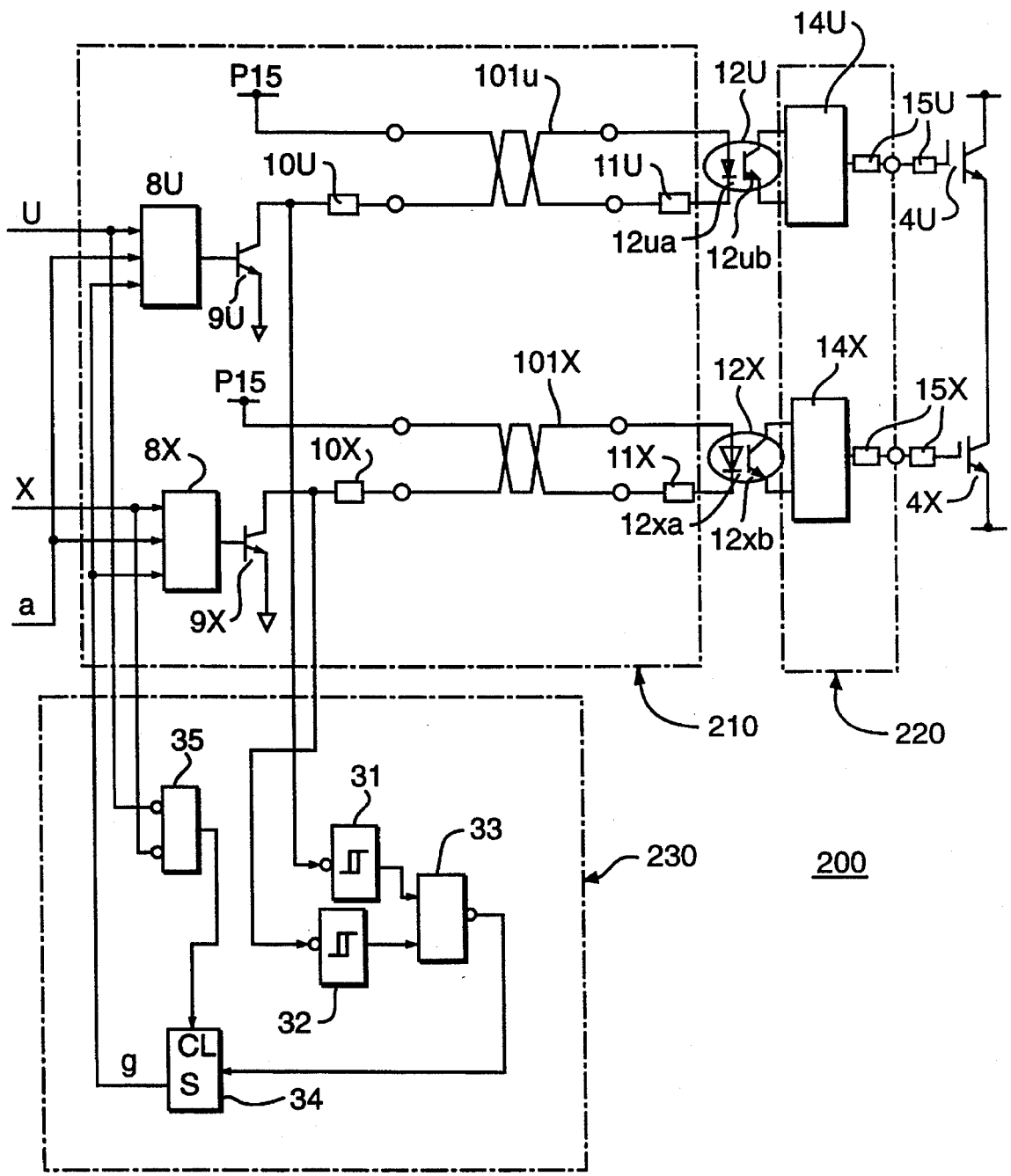
FIG. 1 is a circuit diagram of a principal part of a power converting apparatus according to a first embodiment of the present invention.
Figure 7:
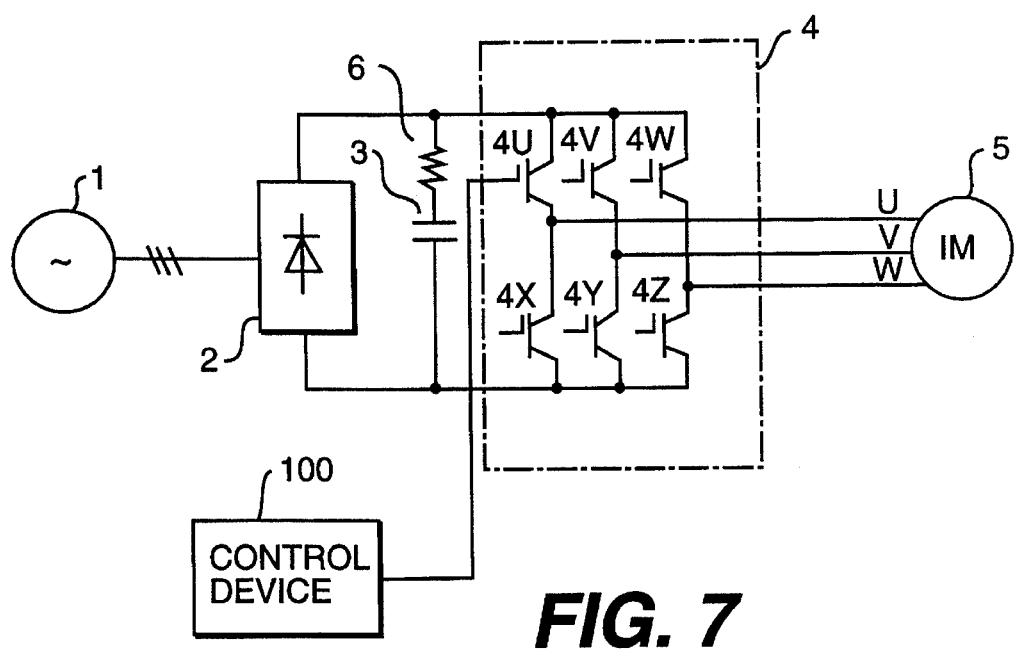
FIG. 7 is a schematic circuit diagram of a general power converting apparatus.

FIG. 1 is a circuit diagram of the principal part of a power converting apparatus according to a first embodiment of the present invention. The diagram shows the structure of a control device and a protection device of semiconductor devices $4u$, $4x$ shown in FIG. 7. The control device and the protection device of semiconductor devices $4v$, $4y$, and the control device and the protection device of semiconductor devices $4w$, $4z$ have the same structure of the control device and the protection device shown in FIG. 1. A control device 200 has a first side control device 210, an isolation devices $12u$, $12x$ and a second side control device 220.

First side control device 210 has a source of electricity P15—, a control signal outputting circuit $8u$, a transistor driver $9u$, limiting resistors $10u$, $11u$, a control signal outputting circuit $8x$, a transistor driver $9x$, and limiting resistors $10x$, $11x$. Control signal outputting circuit $8u$ receives an on/off signal "u" for semiconductor device $4u$ and an action start signal "a". On/off signal "u" is provided from an external control circuits (not shown). Action start signal "a" is used for an elevator action signal when this apparatus is adapted for use with an elevator. Control signal outputting circuit $8u$ outputs a control signal to switch on semiconductor device $4u$. Control signal outputting circuit $8x$ receives an on/off signal "x" for semiconductor device $4x$ and action start signal "a", and outputs a control signal to switch on semiconductor device $4x$. Transistor drivers $9u$, $9x$ switch on when control signal outputting circuits $8u$, $8x$ output each of the control signals.

Isolation devices $12u$, $12x$ isolate first side control device 210 from second side control device 220. For example, isolation device $12u$ is a photo-coupler comprising a light-emitting device $12ua$ and a photo detector $12ub$, and isolation device $12x$ is a photo-coupler comprising a light-emitting device $12xa$ and a photo detector $12xb$.

Figure 8:
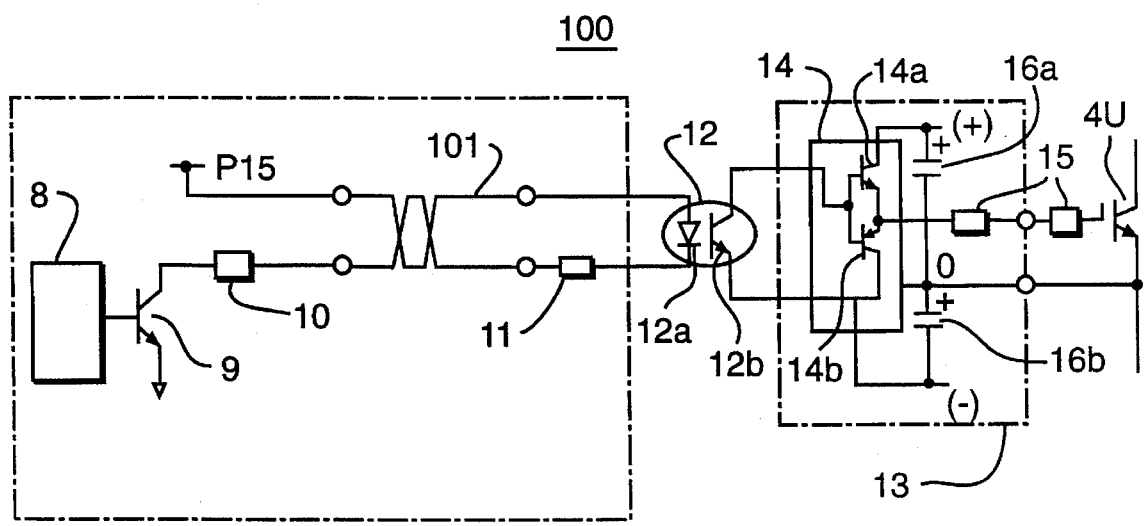
FIG. 8 is a prior art of a control device.

Second side control device 220 has current amplifying circuits $14u$, $14x$ and limiting resistors $15u$, $15x$. Limited resistor $15u$ is connected between current amplifying circuit $4u$ and a gate terminal of semiconductor device $4u$. Limiting resistor $15x$ is connected between current amplifying circuit $14x$ and a gate terminal of semiconductor device $4x$. Some details of current amplifying circuits $14u$, $14x$ are the same as shown in FIG. 8, including a voltage source, such as condensers $16a$, $16b$ shown in FIG. 8, supplying positive voltage or negative voltage to semiconductor devices $4u$, $4x$, and are not shown.

When control signal outputting circuit $8u$ receives on/off signal "u" provided from the external control circuits (not shown) and outputs the control signal, transistor driver $9u$ switches on. Then current flows in the circuit path of source of electricity P15—an electric wire $101u$—light-emitting device $12ua$—limiting resistor $11u$—electric wire $101u$—limiting resistor $10u$—transistor driver $9u$. When light-emitting device $12ua$ radiates, photo detector $12ub$ switches on. Then a switching on signal is provided on the circuit path of current amplifying circuit $14u$—limiting resistor $15u$—semiconductor device $4u$. As a result, semiconductor device $4u$ switches on.

When control signal outputting circuit $8x$ receives on/off signal "x" provided from the external control circuits (not shown) and outputs the control signal, transistor driver $9x$ switches on. Then current flows in the circuit path of source of electricity P15—an electric wire $101x$—light-emitting device $12xa$—limiting resistor $11x$— electric wire $101x$—limiting resistor $10x$—transistor driver $9x$. When light-emitting device $12xa$ radiates, photo detector $12xb$ switches on. Then a switching on signal is provided on the circuit path of current amplifying circuit 14x—limiting resistor 15x—semiconductor device 4x. As a result, semiconductor device 4x switches on.

Protection device 230 has control signal detecting circuits 31, 32, a short-mode detecting circuit 33, a cutting off circuit 34 and a dead-time detecting circuit 35.

Control signal detecting circuit 31 consists of a logic circuit. Control signal detecting circuit 31 detects transistor driver 9u switching on when control signal outputting circuit 8u outputs the control signal. Then control signal detecting circuit 31 outputs a signal "1". Control signal detecting circuit 32 consists of a logic circuit. Control signal detecting circuit 32 detects transistor driver 9x switching on when control signal outputting circuit 8x outputs the control signal. Then control signal detecting circuit 32 outputs a signal "1". Short-mode detecting circuit 33 consists of a NAND circuit. Short-mode detecting circuit 33 receives the signals outputted from control signal detecting circuits 31, 32. When both control signal detecting circuit 31 and control signal detecting circuit 32 output the signal "1" and short-mode detecting circuit 33 receives the signal "1" from control signal detecting circuits 31, 32, short-mode detecting circuit 33 outputs a signal "0". Cutting off circuit 34 outputs a cutting off signal "g" when short-mode detecting circuit 33 outputs the signal "0". Cutting off circuit 34 continues to output cutting off signal "g" until cutting off circuit 34 receives a clear signal (described below). Dead-time detecting circuit 35 receives on/off signals "u", "x" provided from the external control circuits (not shown). Dead-time detecting circuit 35 outputs a signal "1" as the clear signal for cutting off circuit 34 when both on/off signal "u" and on/off signal "x" are off signals (both semiconductor device 4u and semiconductor device 4x are switched off).

FIGS. 2A through 2K are timing charts explaining the operation of the first embodiment of FIG. 1.

Figure 2:
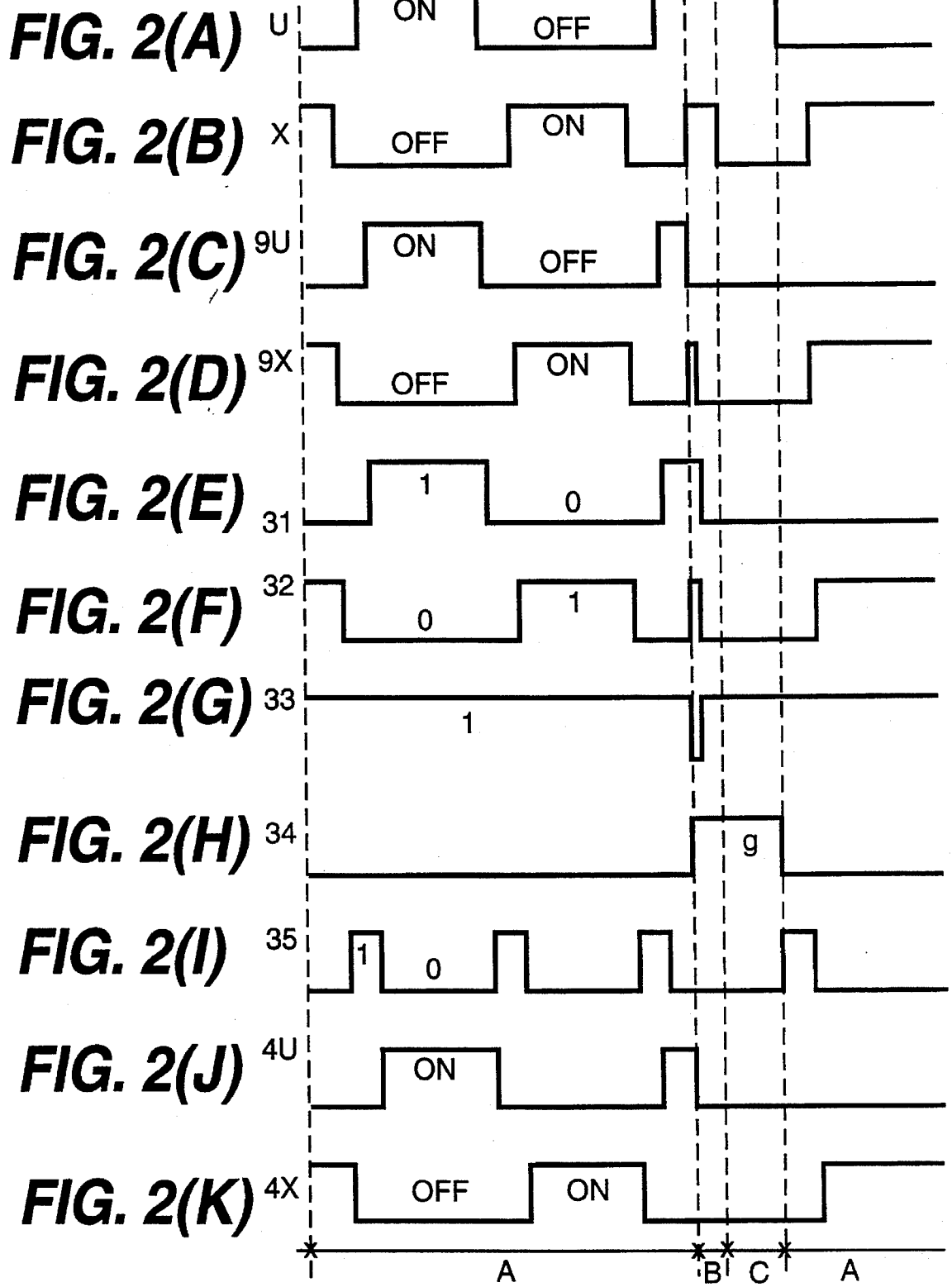
FIGS. 2A through 2k are timing charts explaining the operation of the embodiment of FIG. 1.

In term "A", when control signal outputting circuits 8u, 8x receive on/off signals "u", "x" shown in FIG. 2A and FIG. 2B, transistor drivers 9u, 9x alternate in switching on or switching off as shown in FIG. 2C and FIG. 2D. When control signal detecting circuits 31, 32 detect transistor drivers 9u, 9x switching on, control signal detecting circuits 31, 32 output the signal "1" shown in FIG. 2E and FIG. 2F. Then short-mode detecting circuit 33 outputs the signal "1" shown in FIG. 2G, because both control signal detecting circuit 31 and control signal detecting circuit 32 do not output the signal "1" simultaneously. Therefore cutting off circuit 34 does not output cutting off signal "g" shown in FIG. 2H, and semiconductor devices 4u, 4x alternate in switching on or switching off as shown in FIG. 2J and FIG. 2K. Dead-time detecting circuit 35 outputs the signal "1" shown in FIG. 2I when both on/off signal "u" and on/off signal "x" are off signal.

In term "B", when the external control circuits (not shown) dose not operate normally and provides on/off signal "x" for control signal outputting circuit 8x shown in FIG. 2B, transistor driver 9x switches on as shown in FIG. 2D. Then both control signal detecting circuit 31 and control signal detecting circuit 32 output the signal "1" simultaneously shown in FIG. 2E and FIG. 2F, and short-mode detecting circuit 33 outputs the signal "0" shown in FIG. 2G. Therefore cutting off circuit 34 outputs cutting off signal "g" shown in FIG. 2H. Cutting off circuit 34 continues to output cutting off signal "g" until dead-time detecting circuit 35 outputs the signal "1" shown in FIG. 2I (in term "C"). Control signal outputting circuits 8u, 8x receive cutting off signal "g" and cut off the control signals for transistor drivers 9u, 9x. Therefore semiconductor devices 4u, 4x can be switched off between term "B" and term "C" as shown in FIG. 2J and FIG. 2K. After in term "C", when dead-time detecting circuit 35 outputs the signal "1" shown in FIG. 2I, cutting off circuit 34 is reset.

The above-described first embodiment provides the following effects.

If semiconductor devices 4u, 4x are short-circuited, the control signals to switch on semiconductor devices 4u, 4x outputted from first side control device 210 can be cut off, because protection device 230 always observes the control signals. Therefore semiconductor devices 4u, 4x are switched off before semiconductor devices 4u, 4x operate. The first embodiment can prevent semiconductor device 4u and semiconductor device 4x from being short-circuited, and can prevent semiconductor devices 4u, 4x from being damaged. Also, if semiconductor devices 4v, 4y or semiconductor devices 4w, 4z are short-circuited, semiconductor devices 4v, 4y or semiconductor devices 4w, 4z are switched off before semiconductor devices 4v, 4y or semiconductor devices 4w, 4z operate, too. Therefore the first embodiment can prevent semiconductor device 4v and semiconductor device 4y from being short-circuited, or semiconductor device 4w and semiconductor device 4z from being short-circuited, and can prevent semiconductor devices 4v, 4y, 4w, 4z from being damaged.

Figure 3:
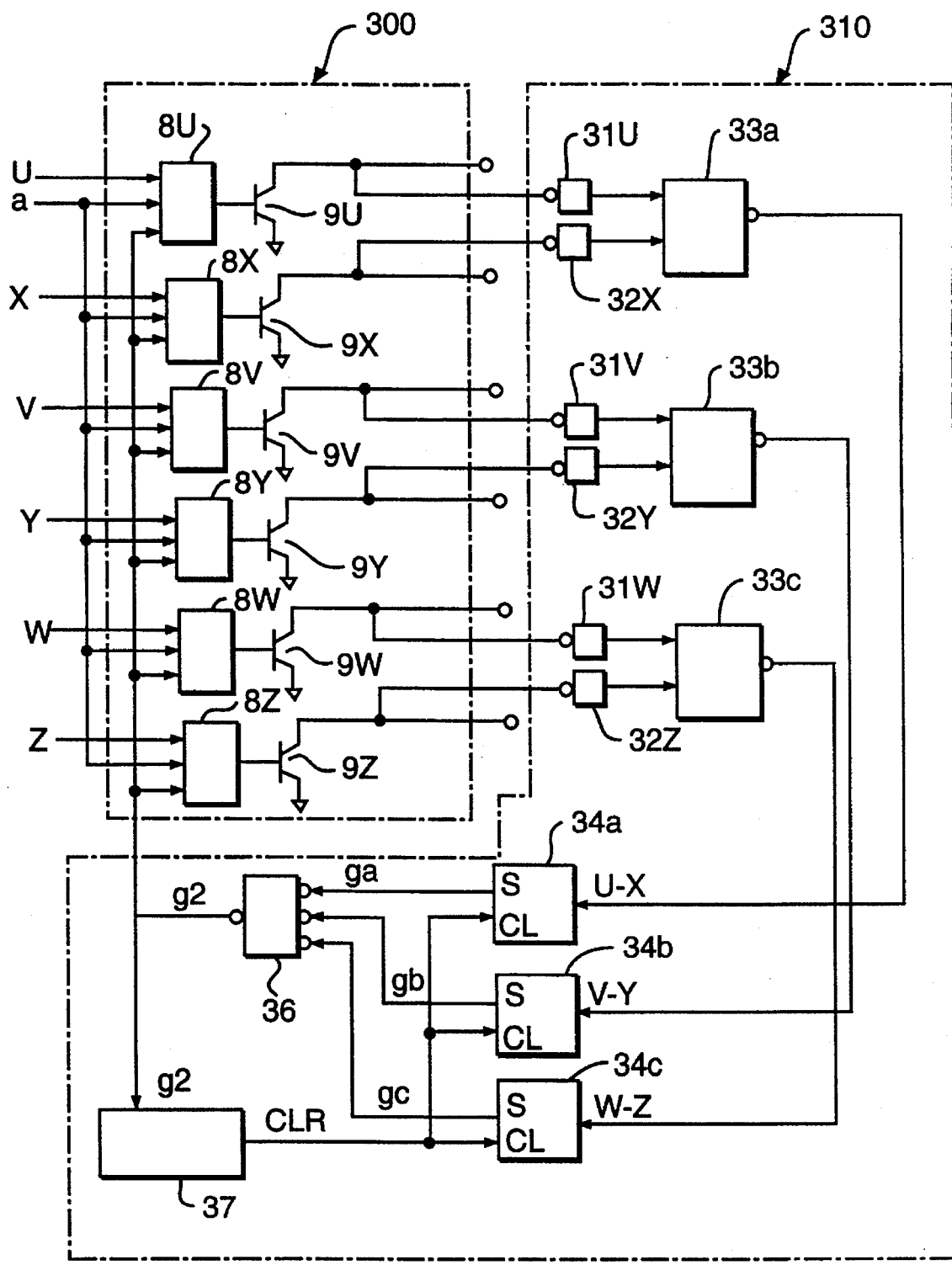
FIG. 3 is a circuit diagram of a principal part of a power converting apparatus according to a second embodiment of the present invention.

FIG. 3 is a circuit diagram of a principal part of a power converting apparatus according to a second embodiment of the present invention. The diagram shows the structure of a first side control device and a protection device of semiconductor devices 4u, 4x, 4v, 4y, 4w, 4z shown in FIG. 7.

First side control device 300 has control signal outputting circuits 8u, 8x, 8v, 8y, 8w, 8z, and transistor drivers 9u, 9x, 9v, 9y, 9w, 9z. Control signal outputting circuits 8u, 8x, 8v, 8y, 8w, 8z output each of control signals to switch on each of semiconductor devices 4u, 4x, 4v, 4y, 4w, 4z. Transistor drivers 9u, 9x, 9v, 9y, 9w, 9z switch on when control signal outputting circuits 8u, 8x, 8v, 8y, 8w, 8z output each of the control signals.

Protection device 310 has control signal detecting circuits 31u, 31v, 31w, 32x, 32y, 32z, short-mode detecting circuits 33a, 33b, 33c, cutting off circuits 34a, 34b, 34c, an all phase cutting off circuit 36, and a cancellation circuit 37.

The operation of control signal detecting circuits 31u, 32x, short-mode detecting circuit 33a and cutting off circuit 34a corresponding to semiconductor devices 4u, 4x will be explained. The operation of each of the circuits corresponding to semiconductor devices 4v, 4y or semiconductor devices 4w, 4z is the same operation as of the circuits corresponding to semiconductor devices 4u, 4x.

Control signal detecting circuit 31u consists of a logic circuit. Control signal detecting circuit 31u detects transistor driver 9u switching on when control signal outputting circuit 8u outputs the control signal. Then control signal detecting circuit 31u outputs a signal "1". Control signal detecting circuit 32x consists of a logic circuit. Control signal detecting circuit 32x detects transistor driver 9x switching on when control signal outputting circuit 8x outputs the control signal. Then control signal detecting circuit 32x outputs a signal "1". Short-mode detecting circuit 33a consists of a NAND circuit. Short-mode detecting circuit 33a receives a signal outputted from control signal detecting circuits 31u, 32x. When both control signal detecting circuit 31u and control signal detecting circuit 32x output the signal "1" and short-mode detecting circuit 33a receives the signal "1" from control signal detecting circuits 31u, 32x, short-mode detecting circuit 33a outputs a signal "0". Cutting off circuit 34a outputs a cutting off signal "ga" when short-mode detecting circuit 33a outputs the signal "0". Cutting off circuit 34a continues to output cutting off signal "ga" until cutting off circuit 34a receives a clear signal "CLR" (described below).

Cutting off circuits 34a, 34b, 34c output cutting off signals "ga", "gb", "gc" respectably when semiconductor devices 4u, 4x or semiconductor devices 4v, 4y or semiconductor devices 4w, 4z are short-circuited. All phase cutting off circuit 36 receives the signals outputted from cutting off circuits 34a, 34b, 34c. All phase cutting off circuit 36 outputs an all phase cutting off signal "g2" when at least one cutting off circuits 34a, 34b, 34c outputs cutting off signal "ga" or cutting off signal "gb" or cutting off signal "gc". Control signal outputting circuits 8u, 8x, 8v, 8y, 8w, 8z receive all phase cutting off signal "g", and cut off the control signals for transistor drivers 9u, 9x, 9v, 9y, 9w, 9z. Therefore semiconductor devices 4u, 4x, 4v, 4y, 4w, 4z can switch off and inverter 4 can stop operation.

The above-described second embodiment provides the following effects.

If semiconductor devices 4u, 4x or semiconductor devices 4v, 4y or semiconductor devices 4w, 4z are short-circuited, the control signals to switch on semiconductor devices 4u, 4x, 4v, 4y, 4w, 4z outputted from first side control device 300 can be cut off, because protection device 310 always observes the control signal.

Cancellation circuit 37 checks inverter 4 by software or hardware. Cancellation circuit 37 outputs clear signal "CLR" for cutting off circuits 34a, 34b, 34c when cancellation circuit 37 determines that inverter 4 is in a normal condition. Therefore inverter 4 can operate again after cancellation circuit 37 checks that inverter 4 is in a normal condition, because cutting off circuits 34a, 34b, 34c are reset and cutting off signals "ga", "gb", "gc" outputted from cutting off circuits 34a, 34b, 34c are canceled.

Figure 4:
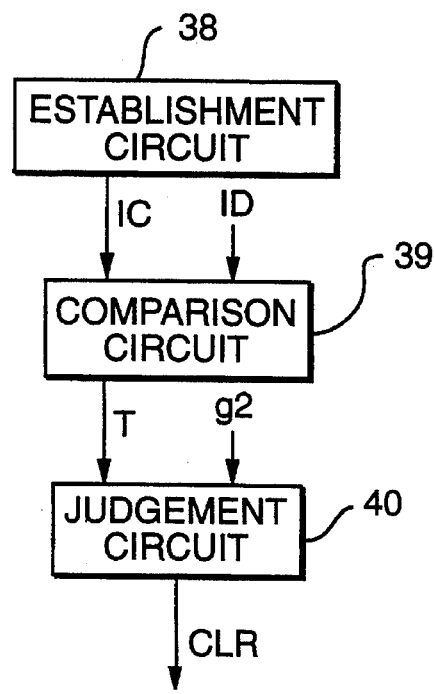
FIG. 4 is a circuit diagram of a principal part of a power converting apparatus according to a third embodiment of the present invention.

FIG. 4 is a circuit diagram of a principal part of a power converting apparatus according to a third embodiment of the present invention. The diagram shows the structure of cancellation circuit 37 shown in FIG. 3.

Cancellation circuit 37 has an establishment circuit 38, a comparison circuit 39, and a judgment circuit 40.

Establishment circuit 38 establishes a limited value "IC". Limited value "IC" is threshold value to damage for semiconductor devices 4u, 4x, 4v, 4y, 4w, 4z. Comparison circuit 39 receives limited value "IC" and a detection value "ID" detected by current detector 6 shown in FIG. 7. Comparison circuit 39 outputs a normal signal "T" when detection value "ID" is less than limited value "IC". Judgment circuit 40 receives a signal outputted from comparison circuit 39 and a signal outputted from all phase cutting off circuit 36. Judgment circuit 40 outputs clear signal "CLR" when judgment circuit 40 receives normal signal "T" outputted from comparison circuit 39 and all phase cutting off signal "g2" outputted from all phase cutting off circuit 36.

Therefore if semiconductor devices 4u, 4x, 4v, 4y, 4w, 4z are damaged and detection value "ID" is more than limited value "IC", judgment circuit 40 does not output clear signal "CLR". As a result, inverter 4 is treated as being unable to continue operation.

Figure 5:
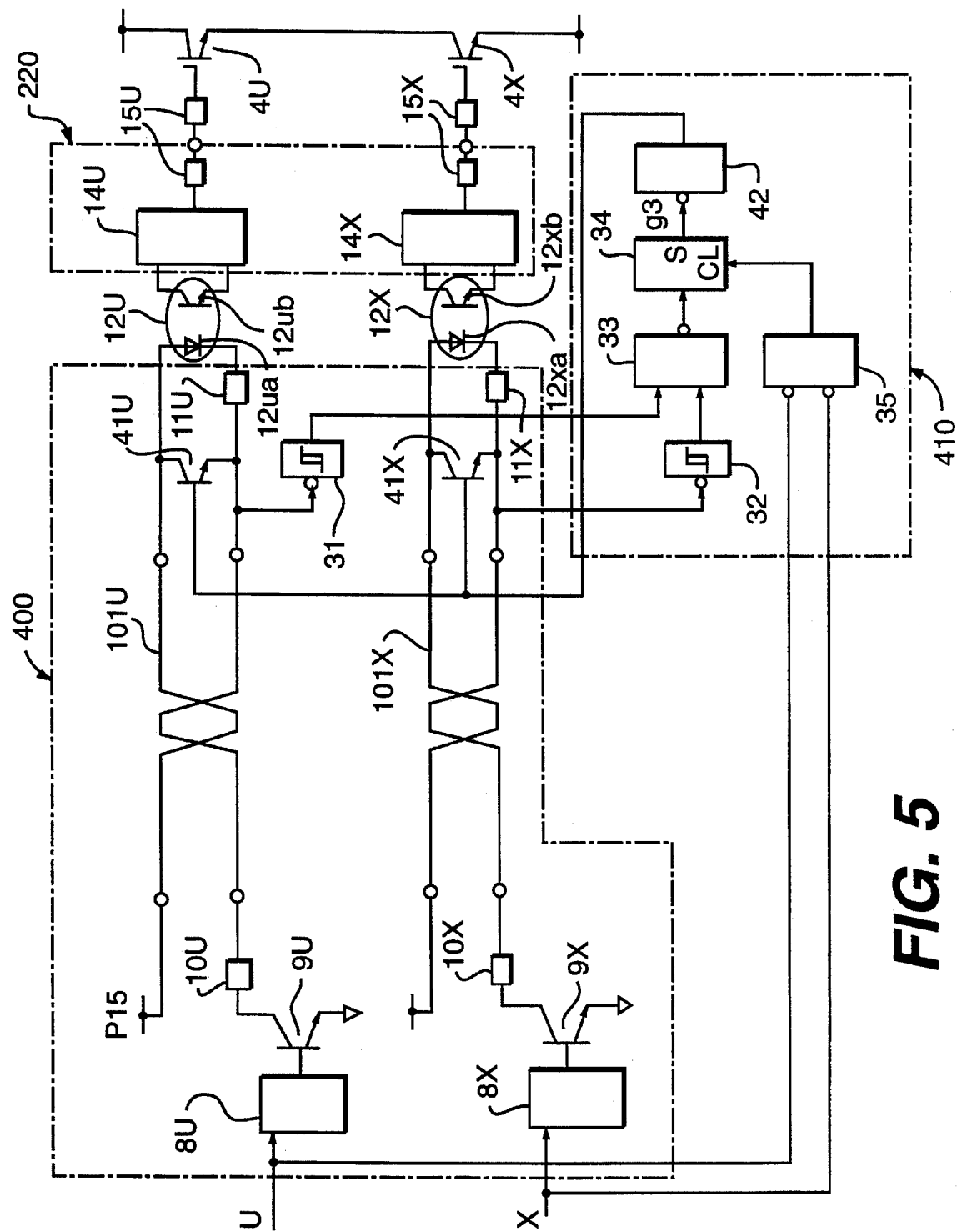
FIG. 5 is a circuit diagram of a principal part of a power converting apparatus according to a fourth embodiment of the present invention.

FIG. 5 is a circuit diagram of a principal part of a power converting apparatus according to a fourth embodiment of the present invention. The embodiment shows the structure of a control device and a protection device of semiconductor devices 4u, 4x shown in FIG. 7. The control device and the protection device of semiconductor devices 4v, 4y, and the control device and the protection device of semiconductor devices 4w, 4z have the same structure of the control device and the protection device shown in FIG. 5.

A first side control device 400 is similar in construction to first side control device 210 shown in FIG. 1 but additionally transistors 41u, 41x for cutting off first side control device 210 shown in FIG. 1. A protection device 410 is similar in construction to protection device 30 shown in FIG. 1 but additionally a driving circuit 42.

Control signal detecting circuits 31, 32 detect transistor drivers 9u, 9x switching on or switching off from current flowing through isolation devices 12u, 12x.

Driving circuit 42 outputs signals to switch on transistor drivers 41u, 41x when driving circuit 42 receives cutting off signal "g3" outputted from cutting off circuit 34.

Cutting off circuit 34 outputs cutting off signal "g" for driving circuit 42 when short-mode detecting circuit 33 outputs the signal "0".

When transistors 41u, 41x switch on, the current flowing in electric wires 101u, 101x flows through transistors 41u, 41x. Therefore the current does not flow through light-emitting device 12ua, 12xa, and the switching on signal outputted from second side control device 220 is cut off.

Therefore if first side control device 400 does not operate normally and outputs the control signal to switch on semiconductor devices 4u, 4x, 4v, 4y, 4w, 4z by resonance with the length of electric wires 101u, 101x, the switching on signal to switch on semiconductor devices 4u, 4v or semiconductor devices 4v, 4y or semiconductor devices 4w, 4z is cut off. As a result, this embodiment can prevent semiconductor devices 4u, 4x, 4v, 4y, 4w, 4z from being short-circuited before semiconductor devices 4u, 4x, 4v, 4y, 4w, 4z operate.

Figure 6:
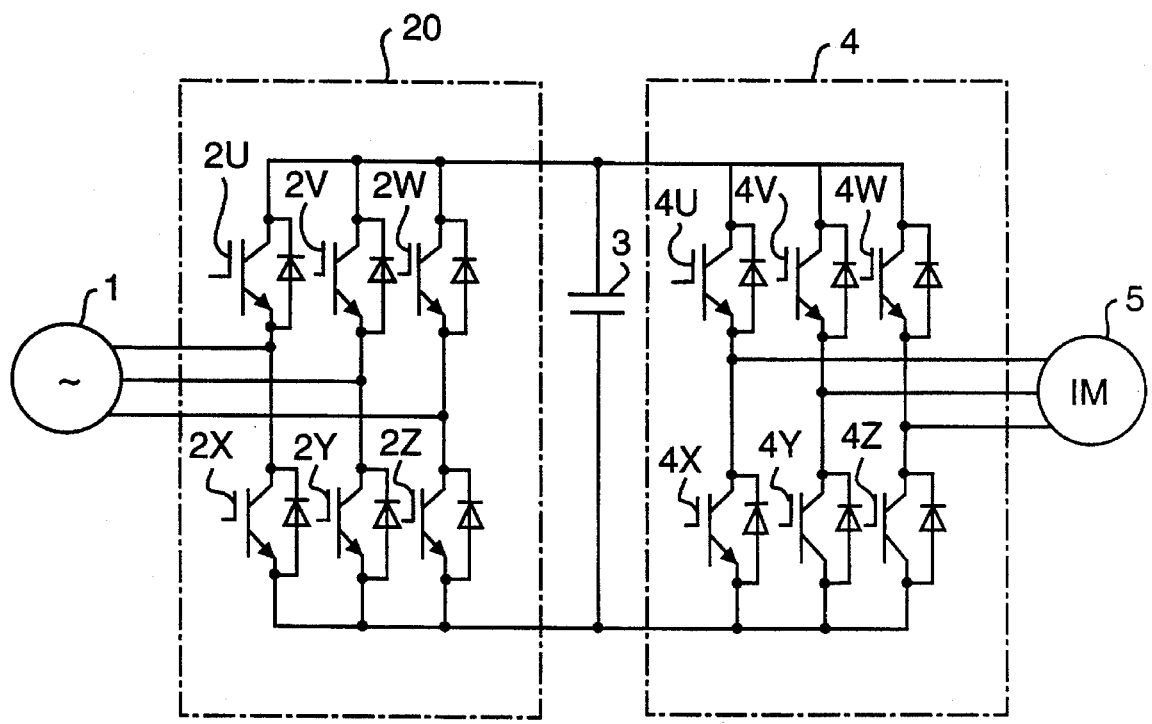
FIG. 6 is a circuit diagram of a principal part of a power converting apparatus according to a fifth embodiment of the present invention.

FIG. 6 is a circuit diagram of a principal part of a power converting apparatus according to a fifth embodiment of the present invention. The diagram shows the structure of a main circuit.

A converter 20 comprises self turn-off type semiconductor devices 2u, 2x, 2v, 2y, 2w, 2z such as Tr, GTR, IGBT, and GTO. Semiconductor device 2u is connected in series with semiconductor device 2x. Semiconductor device 2v is connected in series with semiconductor device 2y. Semiconductor device 2w is connected in series with semiconductor device 2z. Three phase AC power source 1 is connected between semiconductor device 2u and semiconductor device 2x, between semiconductor device 2v and semiconductor device 2y, and between semiconductor device 2w and semiconductor device 2z. The output terminals of converter 20 are connected to inverter 4 through condenser 3. The output terminals of inverter 4 are connected to induction motor 5. A diode is connected in the reverse direction and in parallel with each of semiconductor devices 2u, 2x, 2v, 2y, 2w, 2z, 4u, 4x, 4v, 4y, 4w, 4z.

Converter 20 converts the three phase AC voltage provided from three phase AC power source 1 to a DC voltage by boosting or rectifying three phase AC voltage. Converter 20 regenerates a regenerative energy from induction motor 5 to AC power source 1. In these case semiconductor devices 2u, 2x, 2v, 2y, 2w, 2z alternate in switching on or switching off. Therefore each of the above disclosed embodiments can apply to the semiconductor devices of converter 20.

Additional advantages and modifications will readily occur to those skilled in the art. The invention in its broader aspects is therefore not limited to the specific details, representative apparatus and method, and illustrative examples shown and described. Accordingly, departures may be made from such details without departing from the spirit or scope of the general inventive concept. Thus, it is intended that this invention cover the modifications and variations of the invention provided they are within the scope if the appended claims and their equivalents.

What is claimed is:

1. A power converting apparatus comprising:

conversion means including first and second semiconductor devices coupled in series;

control means for outputting a plurality of control signals for switching on the first and second semiconductor devices; and protection means for detecting the control signals and cutting off the control signals for the first and second semiconductor devices when the control signals for the first and second semiconductor devices are detected simultaneously.

2. A power converting apparatus comprising:

conversion means having a plurality of arms connected in parallel, each the arm having a plurality of semiconductor devices connected in series;

control means for outputting a plurality of control signals for switching on each of the semiconductor devices of a selected one of the arms; and protection means for detecting the control signals and cutting off the control signals for the semiconductor devices of the selected arm when the control signals for each of the semiconductor devices of the selected arm are detected simultaneously.

3. A power converting apparatus comprising:

conversion means including first and second semiconductor devices coupled in series;

first side control means for outputting a plurality of control signals;

isolation means for isolating the first side control means from gate terminals of the first and second semiconductor devices;

second side control means for outputting the control signals outputted via the isolation means from the first side control means as a plurality of switching on signals to the first and second semiconductor devices;

first detection means for detecting the control signal for the first semiconductor device;

second detection means for detecting the control signal for the second semiconductor device; and cutting off means for cutting off the control signals for the first and second semiconductor devices when the control signals for the first and second semiconductor devices are detected simultaneously by the first and second detection means.

4. A power converting apparatus comprising:

conversion means having a plurality of arms connected in parallel, each the arm having first and second semiconductor devices connected in series;

first side control means for outputting a plurality of control signals;

isolation means for isolating the first side control means from gate terminals of the first and second semiconductor devices of a selected one of the arms;

second side control means for outputting the control signals outputted via the isolation means from the first side control means as a plurality of switching on signals to the first and second semiconductor devices of the selected arm;

first detection means for detecting the control signal for the first semiconductor device of the selected arm;

second detection means for detecting the control signal for the second semiconductor device of the selected arm; and cutting off means for cutting off the control signals for the first and second semiconductor devices of the selected arm when the control signals for the first and second semiconductor devices of the selected arm are detected simultaneously by the first and second detection means.

5. A power converting apparatus comprising:

conversion means including first and second semiconductor devices coupled in series;

control means for outputting a plurality of control signals to switch on the first and second semiconductor devices;

cutting off means for cutting off the control signals for the first and second semiconductor devices when the control signals for the first and second semiconductor devices are detected simultaneously: and cancellation means for resetting the cutting off means.

6. A power converting apparatus comprising:

conversion means having a plurality of arms connected in parallel, each the arm having a plurality of semiconductor devices connected in series;

control means for outputting a plurality of control signals to switch on each of the semiconductor devices of a selected one of the arms;

cutting off means for cutting off the control signals for each of the semiconductor devices of the selected arm when the control signals for each of the semiconductor devices of the selected arm are detected simultaneously; and cancellation means for resetting the cutting off means.

7. A power converting apparatus comprising:

conversion means including first and second semiconductor devices coupled in series;

first side control means for outputting a plurality of control signals in response to externally applied on/off signals for the first and second semiconductor devices;

isolation means for isolating the first side control means from gate terminals of the first and second semiconductor devices;

second side control means for outputting the control signals outputted via the isolation means from the first side control means as a plurality of switching on signals to the first and second semiconductor devices;

first detection means for detecting the control signal for the first semiconductor device;

second detection means for detecting the control signal for the second semiconductor device;

cutting off means for cutting off the control signals for the first and second semiconductor devices when the control signals for the first and second semiconductor devices are detected simultaneously by the first and second detection means; and cancellation means for detecting the on/off signals and resetting the cutting off means when the on/off signals for the first and second semiconductor devices are off signals simultaneously.

8. A power converting apparatus comprising:

conversion means having a plurality of arms connected in parallel, each the arm having a plurality of semiconductor devices connected in series;

first side control means for outputting a plurality of control signals in response to externally applied on/off signals for the semiconductor devices of a selected one of the arms;

isolation means for isolating the first side control means from gate terminals of the semiconductor devices of the selected arm;

second side control means for outputting the control signals outputted via the isolation means from the first side control means as a plurality of switching on signals to the semiconductor devices of the selected arm;

first detection means for detecting the control signal for a first one of the semiconductor devices of the selected arm;

second detection means for detecting the control signal for a second one of the semiconductor devices of the selected arm;

cutting off means for cutting off the control signals for the first and second semiconductor devices of the selected arm when the control signals for the first and second semiconductor devices of the selected arm are detected simultaneously by the first and second detection means; and cancellation means for detecting the on/off signals and resetting the cutting off means when the on/off signals for each of the first and second semiconductor devices of the selected arm are off signals simultaneously.

9. A power converting apparatus comprising:

conversion means having a plurality of arms connected in parallel, each the arm having a plurality of semiconductor devices connected in series;

control means for outputting a plurality of control signals for switching on each of the semiconductor devices of a selected one of the arms; and protection means for detecting the control signals and cutting off the control signals for all of the semiconductor devices when the control signals for each of the semiconductor devices of any one arm are detected simultaneously.

10. A power converting apparatus comprising:

conversion means having a plurality of arms connected in parallel, each the arm having a plurality of semiconductor devices connected in series;

control means for outputting a plurality of control signals for switching on each of the semiconductor devices of a selected one of the arms;

cutting off means for detecting the control signals and cutting off the control signals for all of the semiconductor devices when the control signals for each of the semiconductor devices of any one arm are detected simultaneously; and cancellation means for resetting the cutting off means.

11. A power converting apparatus as claimed in claim 10, wherein the cancellation means includes:

current detection means for detecting current which flows through a condenser connected to an input terminal of the conversion means;

comparison means comparing the detected current and a predetermined value; and judgment means for resetting the cutting off means when the detected current is more than the predetermined value.

12. A power converting apparatus as claimed in any one of claims 1–10, wherein the conversion means outputs one of an alternating current power and a direct current power.

13. A power converting apparatus as claimed in any one of claims 1–10, wherein the conversion means includes:

a converter converting an alternating current power to a direct current power; and an inverter converting the direct current power to a three phase alternating current power.

14. A power converting apparatus as claimed in any one of claims 1–10, wherein the semiconductor devices include self turn-off type semiconductor devices.

15. A power converting apparatus comprising:

conversion means having a plurality of arms connected in parallel, each the arm having a plurality of semiconductor devices connected in series, the conversion means outputting one of an alternating current power and a direct current power by operation of the plurality of semiconductor devices;

control means for outputting a plurality of control signals for switching on each of the semiconductor devices; and protection means for detecting the control signals and stopping operation of the conversion means when the control signals for each of the semiconductor devices of any one arm are detected simultaneously.

16. A control device for a power converting apparatus, the power converting apparatus including conversion means having first and second semiconductor devices coupled in series, the control device comprising:

control means for outputting a plurality of control signals for switching on the first and second semiconductor devices; and protection means for detecting the control signals and cutting off the control signals for the first and second semiconductor devices when the control signals for the first and second semiconductor devices are detected simultaneously.

17. A control device for a power converting apparatus, the power converting apparatus including conversion means having a plurality of arms connected in parallel, each the arm having a plurality of semiconductor devices connected in series, the control device comprising:

the control means for outputting a plurality of control signals for switching on each of the semiconductor devices of a selected one of the arms; and protection means for detecting the control signals and cutting off the control signals for the semiconductor devices of the selected arm when the control signals for each of the semiconductor devices of the selected arm are detected simultaneously.

18. A control device for a power converting apparatus, the power converting apparatus including conversion means having first and second semiconductor devices coupled in series, the control device comprising:

control means for outputting a plurality of control signals to switch on the first and second semiconductor devices;

cutting off means for cutting off the control signals for the first and second semiconductor devices when the control signals for the first and second semiconductor devices are detected simultaneously; and cancellation means for resetting the cutting off means.

19. A control device for a power converting apparatus, the power converting apparatus including conversion means having a plurality of arms connected in parallel, each the arm having a plurality of semiconductor devices connected in series, the control device comprising:

control means for outputting a plurality of control signals to switch on each of the semiconductor devices of a selected one of the arms;

cutting off means for cutting off the control signals for each of the semiconductor devices of the selected arm when the control signals for each of the semiconductor devices of the selected arm are detected simultaneously; and cancellation means for resetting the cutting off means.

20. A control device for a power converting apparatus, the power converting apparatus including conversion means having a plurality of arms connected in parallel, each the arm having a plurality of semiconductor devices connected in series, the control device comprising:

control means for outputting a plurality of control signals for switching on each of the semiconductor devices of a selected one of the arms;

cutting off means for detecting the control signals and cutting off the control signals for all of the semiconductor devices when the control signals for each of the semiconductor devices of any one arm are detected simultaneously; and cancellation means for resetting the cutting off means.

* * * * *